United States Patent Office 3,077,047
Patented Feb. 12, 1963

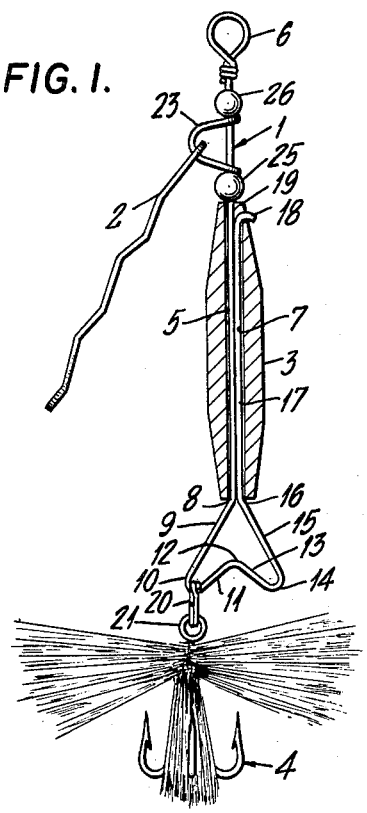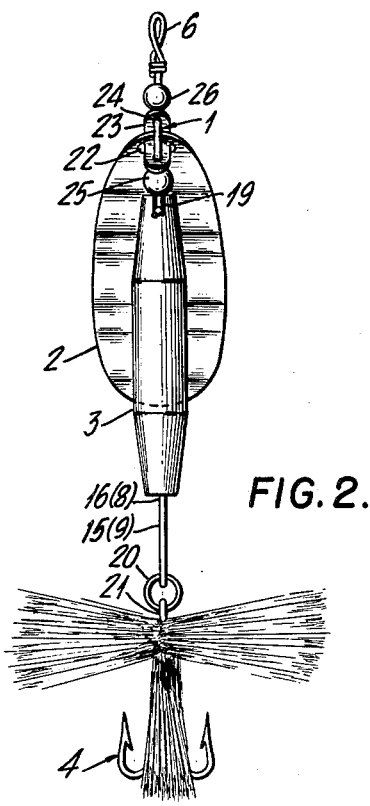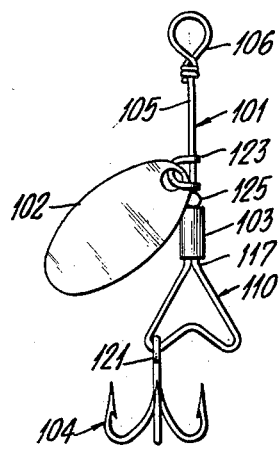

3,077,047
FISH LURE
Göte Ingvar Borgström, Svangsta, Sweden, assignor to AB Urfabriken, Svangsta, Sweden, a corporation of Sweden
Filed Dec. 12, 1960, Ser. No. 75,182
3 Claims. (Cl. 43—42.17)

This invention relates to fishing lures and, more particularly, to fishing lures of the type embodying a spinner or like rotating element which tends to rotate the lure, and therefore twist the line, as the lure is drawn through the water.

In the fishing lure art, it is common to provide the lure with at least one spinner attached in such fashion as to be caused to rotate by forward movement of the lure through the water. Sure lures usually include a central shaft of wire which has a straight portion defining the axis of rotation of the spinner, the line being attached to one end of the shaft and a trailing hook being attached to the opposite end. The spinner can be of various types, the single blade type and the propeller type being typical, and can be mounted on the shaft in various manners. Thus, the single blade spinner is usually provided with an opening accommodating a U-shaped member the legs of the U-shaped member having aligned openings through which the shaft extends, and the propeller type spinner usually has a central opening through which the shaft extends.

All of such lures are characterized by the fact that rotation of the spinner, as the lure is drawn through the water, tends to rotate the lure and therefore to twist the line. With some types of fishing tackle, a small amount of line twist can be tolerated. In most cases, however, any material twisting of the line is objectionable, this being particularly true in the case of so-called "spinning" tackle employing a light, monofilament line. Accordingly, prior-art workers have continually sought a simple and satisfactory way to combat the line twist problem.

While several proposals have been made in the past for reducing the tendency for line twist to occur as a result of rotation of a spinner or the like, none has truly solved the problem. Thus, while it has become almost standard practice to employ a barrel swivel or the like, either interposed between the lure and the line or incorporated as part of the lure, the action of a swivel is not in itself adequate to prevent or even satisfactorily minimize line twist under many circumstances met with during fishing. For example, the tendency for the line to be twisted is perhaps at a maximum when the lure is being drawn against a strong current and it is just this set of circumstances which places maximum tension on the swivel and therefore reduces the effectiveness of the swivel. It has also been proposed to provide weighted keels and vanes secured to but opposite from the shaft or some other suitable part of the lure, the keels or vanes having a tendency to maintain the lure in what may be considered a normal upright position. However, the effectiveness of such devices to counteract line twist varies directly as the size and weight of the keel and vane, so that unduly bulky and heavy constructions would be required for truly satisfactory operation. The problem is further accentuated by the present tendency, resulting from the possibility of "spinning" tackle, to design lighter and smaller lures. Obviously, the smaller the lure, the more difficult it is to provide even a good swivel construction within the prescribed design limitations.

According, it is a general object of the present invention to provide a fishing lure of the type referred to which is so constructed and arranged that the tendency for the lure to rotate, and therefore for the line to be twisted, as a result of rotation of the spinner is successfully opposed.

Another object is to devise a fishing lure including a spinner or like rotating element and wherein the tendency for the lure to rotate and twist the line is opposed by forces resulting entirely from the disposition of at least one part of the lure, such as a trailing hook, which disposition occurs automatically and inherently when the lure is drawn through the water.

A further object is to provide an anti-line-twist fishing lure embodying a rotating element, such as a spinner, and wherein the tendency for the lure to rotate as a result of operation of the spinner is successfully minimized without requiring the use of such element in addition to those parts normally required for the lure.

In order that the manner in which these and other objects are attained in accordance with the invention can be understood in detail, reference is had to the accompanying drawings, which form a part of this specification, and wherein:

FIG. 1 is an elevational view of a fishing lure constructed in accordance with one embodiment of the invention, the lure body being illustrated in longitudinal section;

FIG. 2 is an elevational view of the lure of FIG. 1, viewing the lure from another direction and showing the lure body in full elevation; and FIG. 3 is an elevational view of a fishing lure constructed in accordance with another embodiment of the invention.

Referring now to the drawings in detail, and first to FIGS. 1 and 2 thereof, it will be seen that the embodiment of the invention here illustrated is a "spinning" lure comprising a wire member indicated generally at 1, a generally elliptical spinner blade 2, an elongated lure body 3 and a feathered treble trailing hook 4. The wire body 1 includes an elongated straight portion 5 provided at one end with a closed line-attaching loop 6, straight portion 5 being considerably longer than body 3. Body 3, fabricated from metal or the like, has a circular transverse cross-section and is provided with an axially extending through bore 7 which has a diameter slightly more than twice the diameter of the wire from which member 1 is fabricated.

As shown in FIG. 1, straight portion 5 extends from the front of the lure completely through bore 7 of body 3, and is then provided with a bend 8 so that a straight portion 9 of the wire extends rearwardly and outwardly with respect to the central axis of body 3. Portion 9 terminates in a first reverse bend 10 and, from this bend, a straight portion 11 of the wire extends forwardly and inwardly toward the axis of body 3. Portion 11 terminates in a second reverse bend 12. From bend 12, a portion 13 of wire member 1 extends rearwardly and outwardly with respect to the axis of body 3 and terminates in a third reverse bend 14. From bend 14, portion 15 of wire member 1 extends forwardly and inwardly toward the axis of the lure, terminating in a bend indicated at 16.

The remainder of member 1 includes a second straight portion 17 which extends forwardly within bore 7 of body 3 and terminates in an outwardly directed hooked end portion 18. As best seen in FIG. 2, the front end of body 3 is provided with a radially disposed slot 19 which opens both forwardly and outwardly, and the hook end portion 18 is engaged in this slot.

Accordingly, portions 9—15 of wire member 1 define a hook-attaching loop which is maintained effectively closed because straight portions 5 and 17 are disposed in bore 7 and hooked end portion 18 is engaged in slot 19.

The feathered treble hook 4, of a type well known in the art, is attached to the lure by means of a circular ring 20 which extends through both the eye 21 of the treble hook and the hook-attaching loop defined by portions 9—15 of member 1.

The spinner blade 2 is provided at one end with an opening 22 through which extends a generally U-shaped metal strip 23, the legs of member 23 being provided with aligned circular openings 24, FIG. 2, through which the straight portion 5 of wire member 1 extends. A bead 25 is slidably mounted on straight portion 5 between member 24 and body 3, and a second bead 26 is similarly provided between member 23 and the line-attaching loop 6. Thus, it will be seen that the spinner blade 2 is mounted for substantially free rotation about the axis defined by straight portion 5 of wire member 1, so that the spinner blade functions in the usual manner well known in the art.

The fishing line is connected to closed loop 6 in any of the usual fashions, as through a swivel or by being tied directly to the loop 6, so that, when the lure has been cast and is in the water, reeling in of the line will draw the lure through the water with loop 6 leading and hook 4 trailing, and the spinner blade 2 will rotate at a rate dependent upon the relative movement between the lure and the water. Forward movement of the lure results in a drag which is on the feathered hook 4. Accordingly, the hook 4 is forced automatically to travel to one or the other of those lateral positions determined by engagement of ring 20 in bends 10 and 14. Thus, whether hook 4 moves to a position in which the ring 20 is engaged in bend 10 or to a position in which the ring is engaged in bend 14 depends on chance. In either event, however, the hook will move to a position in which it is offset laterally from the central axis of body 3, the amount of the offset being determined by the distance, transversely of the lure, between the center of bend 12 and the normal point of engagement of ring 20 on bend 10. This distance is substantial. It is accordingly seen that the configuration of the hook-attaching loop defined by wire portions 9—15 is such as to assure that the hook 4 moves to a position spaced laterally from the center axis of the lure, in which position the hook acts with a keel effect to oppose any tendency for the lure as a whole to rotate about the central axis of body 3. On the other hand, the hook 4 is maintained in an effective trailing position so that the hooking capabilities of the lure are not decreased. The keel effect supplied because of the offset position of the trailing hook is adequate to satisfactorily minimize the tendency of the lure to twist the line, particularly when the line is attached to ring 6 via a swivel.

Wire portions 9 and 15 project from the central axis of the lure at equal acute angles. Similarly, portions 11 and 13 project from the central axis of the lure at equal angles which, while greater than the angles at which portions 9 and 15 are disposed, are still acute. Bends 10, 12 and 14 are all arcuate and smooth, so that ring 20 can move along portions of the hook-attaching loop even when there is a substantial amount of drag on hook 4. Bend 12, centered on the central axis of the lure, presents a forwardly facing, rearwardly curving surface of such radius of curvature that it is impossible for the ring 20 to remain centered on the hook-attaching loop while the lure is being drawn through the water. Hence, even if the hook were precisely centered, with ring 20 engaging the forwardly facing surface provided by bend 12, forward motion of the lure through the water would cause the hook to shift either to the left or right (as viewed in FIG. 1) and the ring 20 would then travel outwardly along either portion 11 or 13.

The lure construction illustrated in FIGS. 1 and 2 is particularly advantageous, since the lateral surfaces afforded by the hackle and feather on hook 4 materially increases the desired keel effect. However, it is to be understood that the invention is not limited to lures of this type and the lure construction shown in FIG. 3 is illustrative of this fact. In the lure shown in FIG. 3, a wire member 101 is employed, formed at its leading end with a closed line-attaching loop 106 and at its trailing end with the special hook-attaching loop 110 of this invention, loop 110 being constructed precisely as hereinbefore described with reference to FIGS. 1 and 2. The main straight portion 105 of the wire member extends completely through a metal sleeve 103. Additionally, wire member 101 continues from loop 110, providing a straight end portion 117 which is also disposed within sleeve 103. Spinner blade 102 is rotatably mounted on the straight portion 105 of member 101 by a conventional spinner-attaching member 123. A metal bearing bead 125 is slidably disposed on straight portion 105 of member 101 between sleeve 103 and spinner blade attaching-member 123. It will be noted that straight portion 105 of the wire member is longer than the combination of sleeve 103, bead 125 and member 123 by an amount greater than the length of sleeve 103. Hence, sleeve 103 can be moved forwardly on member 101 through a distance great enough to expose the tip of straight end portion 117 of member 101. This allows the user to insert the free end portion 117 through eye 121 of the treble hook 104, so that the hook can be properly positioned on hook-attaching loop 110. After the hook has been applied, sleeve 103 is returned to the position seen in FIG. 3 and the lure is ready for use.

Again, in this embodiment, hook-attaching loop 110 automatically directs hook 104 to either of two laterally opposite positions, in which positions the hook will provide an anti-line-twist keel effect in the manner hereinbefore discussed with reference to FIGS. 1 and 2.

While particularly advantageous embodiments of the invention have been illustrated and described, it will be obvious to those skilled in the art that various changes and modifications can be made without departing from the scope of the invention as defined in the appended claims.

What is claimed is:

1. In a fishing lure, the combination of a shaft; spinner means rotatably carried by said shaft; said shaft being provided with line attachment means ahead of said spinner means and said spinner means tending to rotate the lure and therefore twist the line during use of the lure; means at the trailing end of said shaft forming a hook-attaching loop, a lure body having a longitudinal extending bore, said shaft extending through said bore, said loop including a first portion extending rearwardly and away from the axis of said shaft and terminating in a reverse bend, and a second portion extending from said reverse bend forwardly to the axis of said shaft, said reverse bend being offset laterally from the axis of said shaft by a distance greater than the radius of said bore; and trailing hook means including an eye through which said hook-attaching loop freely extends, said hook means being urged to a position in which said eye is disposed at said reverse bend and said hook means is laterally offset from said bore when the lure is drawn through the water.

2. In a fishing lure, the combination of a wire member including a shank portion provided with a line attachment loop at its leading end, said member being bent to form a hook-attaching loop at the trailing end of said shank portion, said hook-attaching loop extending first rearwardly and outwardly from the axis of said shank to a first reverse bend, thence forwardly and inwardly to a second reverse bend substantially at the axis of said shank and rearwardly thereof, thence again rearwardly and outwardly to a third reverse bend and thence forwardly and inwardly substantially to said axis, said wire member also including an end portion extending forwardly from said hook-attaching loop beside said shank portion; a lure body shorter in length than said shank portion and having a longitudinally extending bore, said shank portion extending through said bore and said end portion being disposed in said bore; spinner means rotatably mounted on said shank portion between said line attachment loop and said lure body, rotation of said spinner means as the lure is drawn through the water tending to rotate said wire member and therefore to twist the line; and trailing hook means including an attachment loop through which said hook-attaching loop freely extends, drag on said hook means as the lure is drawn forwardly through the water being effective to cause the attachment loop of said hook means to shift rearwardly and outwardly to a position in one of said first and third reverse bends, whereby said hook means may be caused to be laterally offset from said shank portion and therefore tends to resist rotation of said wire member and thereby to prevent such tendency to twist the line.

3. In a fishing lure, the combination of a shaft; spinner means rotatably carried by said shaft; said shaft being provided with line attachment means ahead of said spinner means and said spinner means tending to rotate the lure and therefore twist the line during use of the lure; means at the trailing end of said shaft forming a hook-attaching loop, said loop including a first portion extending rearwardly and away from the axis of said shaft and terminating in a reverse bend, a second portion extending from said reverse bend forwardly toward the axis of said shaft, said reverse bend being offset laterally from the axis of said shaft by a material distance; a third portion extending rearwardly and away from the axis of said shaft and terminating in a second reverse bend, and a fourth portion extending from said second reverse bend forwardly toward the axis of said shaft, said second and fourth portions being joined at their forward ends by a third reverse bend; and trailing hook means including an eye through which said hook-attaching loop freely extends, said hook means being urged to a position in which said eye is disposed at one of said first and second reverse bends and said hook means is laterally offset from the axis of said shaft when the lure is drawn through water.

References Cited in the file of this patent

UNITED STATES PATENTS

| | | |
|---|---|---|
| 2,741,057 | Morris et al. | Apr. 10, 1956 |
| 2,804,714 | Kratz | Sept. 3, 1957 |

FOREIGN PATENTS

| | | |
|---|---|---|
| 148,519 | Sweden | Jan. 18, 1955 |